W. F. GIBBS.
INTERNAL COMBUSTION ENGINE.
APPLICATION FILED MAR. 10, 1913.

1,157,379.

Patented Oct. 19, 1915.
3 SHEETS—SHEET 3.

WITNESSES:
Rob't R Kitchel.
Frank C French

INVENTOR
William F. Gibbs
BY
Augustus B. Stoughton.
ATTORNEY.

---

UNITED STATES PATENT OFFICE.

WILLIAM F. GIBBS, OF NEW YORK, N. Y.

INTERNAL-COMBUSTION ENGINE.

1,157,379.   Specification of Letters Patent.   Patented Oct. 19, 1915.

Application filed March 10, 1913. Serial No. 753,300.

*To all whom it may concern:*

Be it known that I, WILLIAM F. GIBBS, a citizen of the United States, residing at New York, in the county of New York and State of New York, have invented certain new and useful Improvements in Internal-Combustion Engines, of which the following specification.

The principal object of the present invention is to improve the construction and operation of the valves, whereby they are positively operated, a very rapid opening and closing obtained, a very large valve area obtained, compact and cylindrical clearance space retained without the necessity of distorting this cylindrical shape by the introduction of pockets, etc., all of which factors have a direct relation to the efficiency of the internal combustion engine. The valves furthermore by this arrangement are not in contact with the piston and are capable of easy removal and application as an assembled unit, and spring piston rings and other packing may be introduced between each sliding surface between which surfaces the gases of combustion or compression would have a tendency to escape.

The invention will be claimed at the end hereof but will first be described in connection with the embodiment of it chosen for illustration in the accompanying drawings in which—

Figure 1:
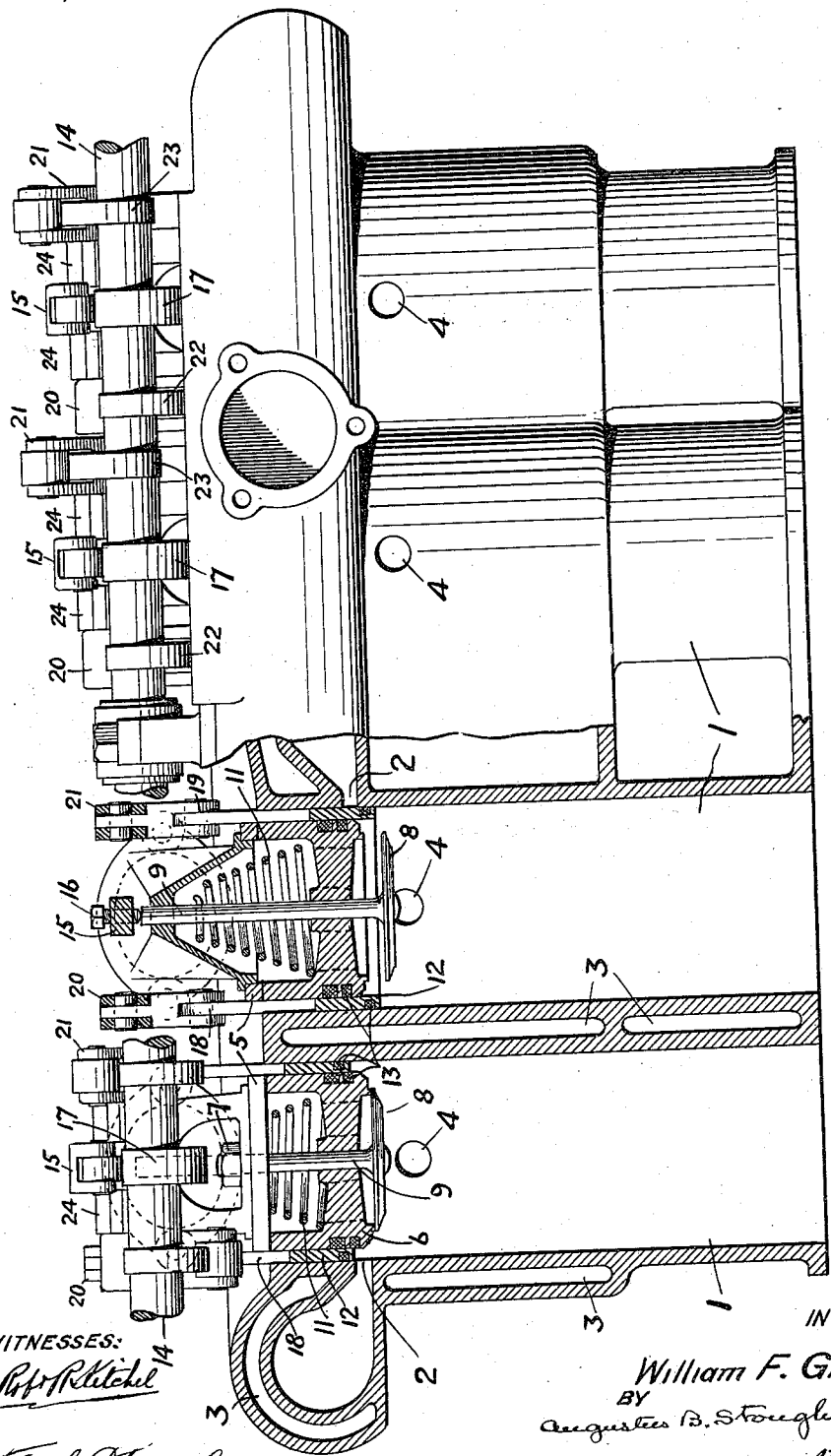
Figure 2:
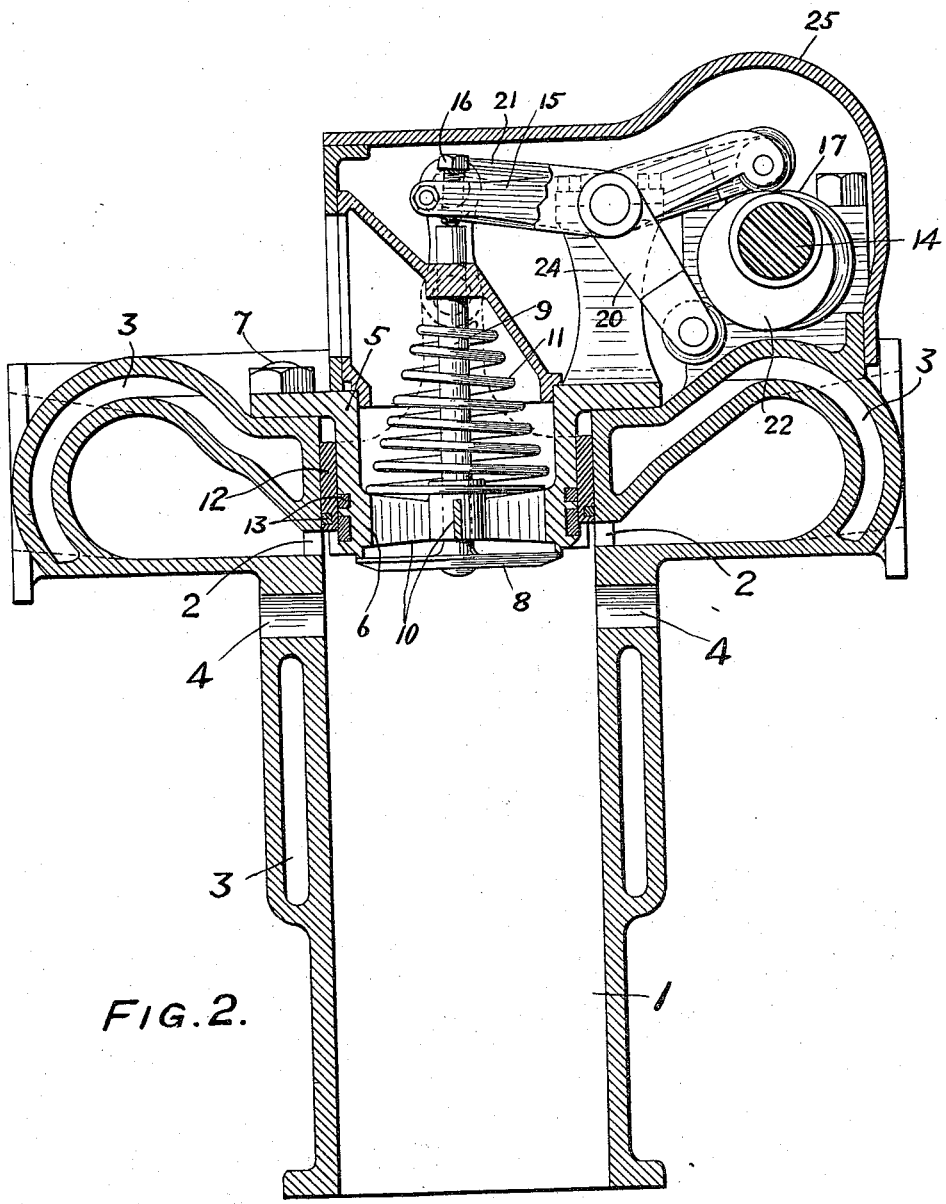
Figure 3:
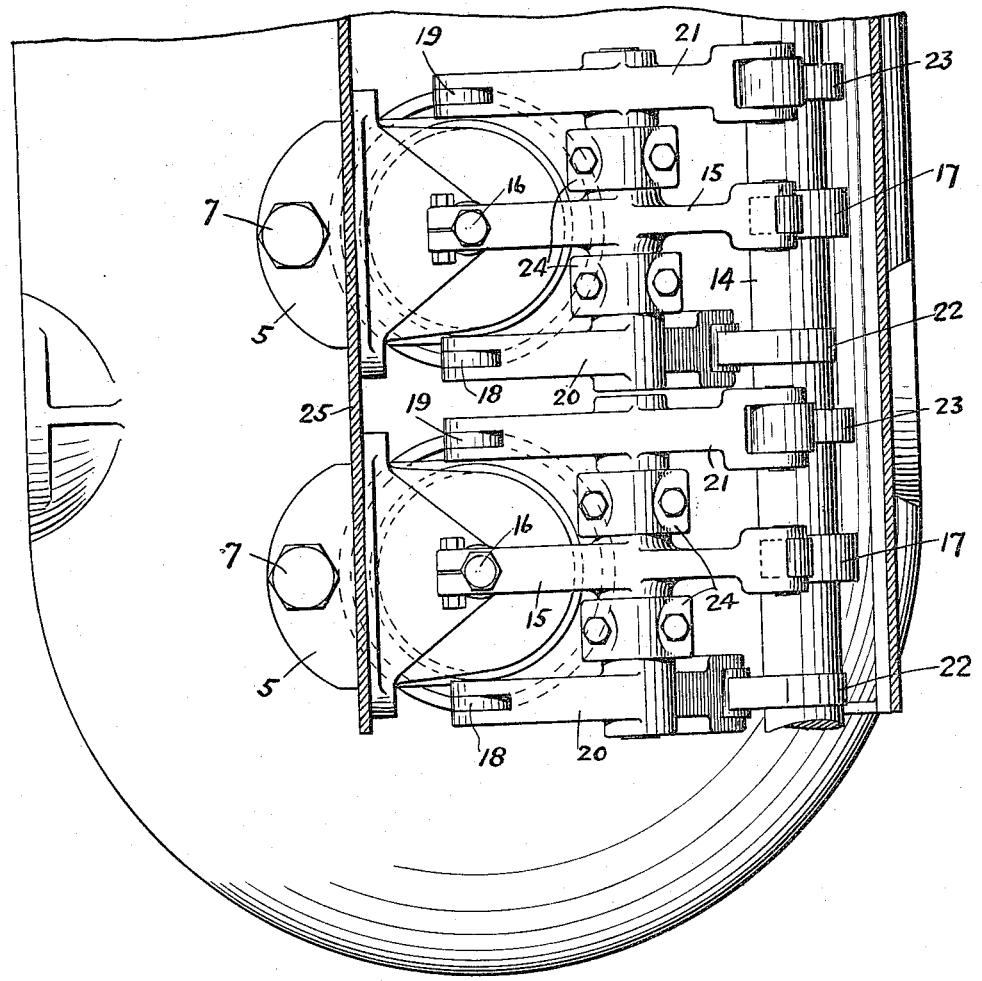

Figure 1, is a side view, partly in section and partly in elevation, of an engine or motor embodying features of the invention. Fig. 2, is a sectional view taken through one of the cylinders in a plane at right angles to the plane of Fig. 1, and Fig. 3, is a partial plan view.

The cylinders and the valve gear therefor are alike and a description of one will suffice. In the drawings 1, is a cylinder having exhaust ports or openings 2, and having at, as shown in the drawings its upper end a clearance space into which the piston does not travel. As shown the exhaust ports 2, are elongated and extend well around the cylinder.

3, are channels for water cooling.

4, are openings for spark plugs.

The cylinder head 5, is provided with a tubular admission projection 6, between which and the end part of the cylinder wall there is an annular space. The cylinder head with the parts which it carries is removable by means of the bolts 7. The puppet valve 8, coöperates with a seat on the inner face of the projection 6, to control the admission, and the stem 9, of this valve works through a spider 10, formed in the extension 6. This spider 10, also coöperates with the spring 11, of the puppet valve.

12, is a sleeve valve occupying the annular space between the projection 6, and the wall of the cylinder, and this sleeve valve is adapted to be projected and retracted to cover and uncover the exhaust ports 2. 13, are spring piston rings or packing rings for making the sleeve tight. The sleeve does not touch or reach the piston and its movements are confined within the clearance space at the end of the cylinder.

14, is a cam shaft which may be arranged parallel with the crank shaft of the motor. The puppet valve is opened against the force of its spring 11, by a centrally pivoted arm 15, one end of which operates, as shown, through the intervention of an adjusting screw 16, on the end of the stem of the puppet valve and the other end of which is operated upon a cam or eccentric 17, on the shaft 14. The sleeve valve 12, is provided with upwardly extending ears 18 and 19. One end of the centrally pivoted arm 20, is connected with one ear 18, and one end of the centrally pivoted arm 21, is connected with the other ear 19, and these arms 20 and 21, are keyed to and made part of the same pivot shaft, and these arms, 20 and 21, are operated upon by oppositely disposed cams or eccentrics 22 and 23, on the shaft 14, so that the sleeve valve 12, is positively operated in each direction. The puppet valve is positively operated in one direction to open it and is spring operated to close it.

24, are supports for the pivot shaft of the valve operating levers 20 and 21, which are keyed to or made integral with said shaft. The valve operating lever 15 is not keyed to said shaft but is free to oscillate thereon.

25, is a hood. By removing the fastenings 7, the cylinder head, both valves and the valve levers are detached from the cylinder so that neither the cylinder nor piston are disturbed while the various parts are readily accessible for cleaning or for repairs. The valves and levers being thus removable as an assembled unit by removing the fastenings 7. The movements of the valves are of course timed to accord with ordinary practice.

It will be obvious to those skilled in the art to which my invention relates that modifications may be made in details of construction and arrangement without departing from the spirit of the invention, hence I do not limit myself in regard to such matters nor further than the prior state of the art may require, but

What I claim is:

1. In an internal combustion engine the combination of a cylinder having a cylindrical clearance space at one end and having a plurality of exhaust ports located around the cylindrical surface of said clearance space and in the same horizontal plane, a removable cylinder head provided with a tubular externally cylindrical admission projection between which and the end part of the cylinder wall there is an annular space, a puppet valve coöperating with the inner face of said tubular projection to control admission, and a sliding sleeve valve of uniform inside and outside diameter and having a cylindrical exterior adapted to the internal cylindrical surface of the said cylindrical space and arranged to slide on the projection past the exhaust ports in both directions.

2. In an internal combustion engine the combination of a cylinder having a clearance space at one end and a plurality of exhaust ports located around the internal surface of said cylinder in the said clearance space and in the same horizontal plane, a removable cylinder head provided with a tubular admission projection between which and the end part of the cylinder wall there is an annular space, a puppet valve coöperating with the inner face of said tubular projection to control admission, a sliding sleeve valve having a cylindrical exterior adapted to the internal surface of the first mentioned cylinder and arranged to slide past the exhaust ports in both directions, and a cam shaft mounted above the cylinders with cams suitably arranged upon said shaft one being used for positively moving said sliding sleeve valve in one direction by a cam lever pivotally connected with the cylinder head and the other for positively moving the said sliding sleeve valve in the opposite direction by a cam lever pivotally connected with the cylinder head and a third cam suitably mounted on said shaft for positively opening the said puppet valve by a cam lever pivotally connected with the cylinder head, substantially as described.

3. In an internal combustion engine the combination of a cylinder having a cylindrical clearance space at one end and having a plurality of exhaust ports located around the cylindrical surface of said clearance space and in the same horizontal plane, a removable cylinder head provided with a tubular admission projection between which and the end part of the cylinder wall there is an annular space, a puppet valve coöperating with the inner face of said tubular projection to control admission, a sliding sleeve valve having a cylindrical exterior adapted to the internal surface of the said cylindrical space and arranged to slide past the exhaust ports in both directions, and a cam shaft mounted above the cylinders with cams suitably arranged upon said shaft one being used for positively moving said sliding sleeve valve in one direction by a cam lever pivotally connected with the cylinder head and the other for positively moving the said sliding sleeve valve in the opposite direction by a cam lever pivotally connected with the cylinder head and a third cam suitably mounted on said shaft for positively opening the said puppet valve by a cam lever pivotally connected with the cylinder head, substantially as described.

4. In an internal combustion engine the combination of a cylinder having exhaust ports through its cylindrical wall, an externally and internally cylindrical tubular cylinder head projecting into the cylinder with space between, a puppet valve coöperating with the inner face of the cylinder head to control admission, a cylindrical slide valve of uniform inside and outside diameter and arranged to slide on the tubular head past the ports in both directions, and mechanism for operating the valves, substantially as described.

In testimony whereof I have hereunto signed my name.

WILLIAM F. GIBBS.

Witnesses:
CLIFFORD K. CASSEL,
FRANK E. FRENCH.

Copies of this patent may be obtained for five cents each, by addressing the "Commissioner of Patents, Washington, D. C."